US008490874B2

(12) United States Patent
Brown et al.

(10) Patent No.: US 8,490,874 B2
(45) Date of Patent: *Jul. 23, 2013

(54) METHOD, SYSTEM AND MOBILE DEVICE EMPLOYING ENHANCED FINGERPRINT AUTHENTICATION

(75) Inventors: Michael Kenneth Brown, Fergus (CA); Neil Patrick Adams, Waterloo (CA); Dinah Lea Marie Davis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,624

(22) Filed: Dec. 7, 2011

(65) Prior Publication Data

US 2012/0080521 A1    Apr. 5, 2012

Related U.S. Application Data

(63) Continuation of application No. 12/325,309, filed on Dec. 1, 2008, now Pat. No. 8,074,880.

(51) Int. Cl.
*G06K 5/00* (2006.01)
(52) U.S. Cl.
USPC ......................................... 235/382; 382/124
(58) Field of Classification Search
USPC ......................................... 235/382; 382/124
See application file for complete search history.

(56) References Cited

U.S. PATENT DOCUMENTS

| 7,136,514 | B1 | 11/2006 | Wong |
| 7,310,029 | B2 | 12/2007 | Robert et al. |
| 8,074,880 | B2 * | 12/2011 | Brown et al. ................. 235/382 |
| 2004/0052407 | A1 | 3/2004 | Kawabe |
| 2005/0028336 | A1 | 2/2005 | Robert et al. |
| 2005/0169503 | A1 | 8/2005 | Howell et al. |
| 2005/0244039 | A1 | 11/2005 | Geoffroy et al. |
| 2006/0078176 | A1 | 4/2006 | Abiko et al. |
| 2007/0086631 | A1 | 4/2007 | Lu et al. |
| 2007/0274575 | A1 | 11/2007 | Russo |
| 2009/0067679 | A1 | 3/2009 | Mainguet |

FOREIGN PATENT DOCUMENTS

| EP | 1645989 A2 | 4/2007 |
| EP | 2192524 | 6/2010 |

OTHER PUBLICATIONS

European Examination Report. Application No. 08170355.5, dated May 16, 2012.
Sigmund Clausen, A Single-Line AC Capacitive Fingerprint Swipe Sensor. (Abstract Only). Available online at: http://www.springerlink.com/content/j833121662571q50, Oct. 6, 2007.

(Continued)

*Primary Examiner* — Daniel Hess
(74) *Attorney, Agent, or Firm* — Bereskin & Parr LLP/S.E.N.C.R.L., s.r.l.

(57) ABSTRACT

The described embodiments relate generally to methods and systems for fingerprint authentication for a computing device. In one embodiment, the method comprises: storing a default finger swipe scan direction; receiving a finger swipe scan; authenticating the received finger swipe scan; determining a received finger swipe scan direction; and configuring the default finger swipe scan direction. The computing device may comprise a mobile device.

20 Claims, 7 Drawing Sheets

OTHER PUBLICATIONS

Vermesan, O. et al, A 500-dpi AC capacitive hybrid flip-chip CMOS ASIC/sensor module for fingerprint, navigation, and pointer detection with on-chip data processing. (Abstract Only). Available online at: http://ieeexplore.ieee.org/xpl/freeabs_all.jsp?tp=&arnumber=1253876&isnumber=28052, Dec. 2003.

European Search Report. Application No. 08170355.5, dated Jul. 13, 2009.

United States Office Action. U.S. Appl. No. 12/325,309, dated Apr. 20, 2011.

Amendment. U.S. Appl. No. 12/325,309, dated Jul. 21, 2011.

Notice of Allowance and Notice of Allowability. U.S. Appl. No. 12/325,309, dated Aug. 11, 2011.

Canadian Office Action. Application No. 2,686,704, dated Jan. 14, 2013.

Response to European Examination Report. Application No. 08170355.5, dated Sep. 19, 2012.

Response. European Application No. 08170355.5. Dated: Jul. 25, 2011.

* cited by examiner

METHOD, SYSTEM AND MOBILE DEVICE EMPLOYING ENHANCED FINGERPRINT AUTHENTICATION

CROSS REFERENCE TO RELATED APPLICATION

This application is a continuation of prior U.S. patent application Ser. No. 12/325,309 filed on Dec. 1, 2008, the entirety of which is hereby incorporated by reference.

TECHNICAL FIELD

The described embodiments relate to methods, systems and mobile devices employing enhanced fingerprint authentication. In particular, the described embodiments are directed towards fingerprint authentication systems and methods configured to anticipate a finger swipe direction.

BACKGROUND

For mobile devices and other computing devices, authentication of a user for access to the mobile device or computing device is an important part of securing the device against unauthorized access to potentially sensitive data.

BRIEF DESCRIPTION OF THE DRAWINGS

Embodiments are described in further detail below, by way of example only, with reference to the accompanying drawings, in which.

DETAILED DESCRIPTION

Some existing computer systems incorporate fingerprint or finger swipe sensors for authenticating the user's authority to access the computer system. With such systems, the computational requirements for authenticating a user's identity may be significant. As a user may be required to reauthenticate himself/herself multiple times, any computational inefficiency may be compounded.

The existing computer operating systems described above typically only allow a user to swipe a finger in a single direction. While sensors can compensate for swiping in a second, reverse direction, computational performance is compromised as the fingerprint analysis generally involves attempting a match in a first direction and if necessary, rotating the swiping image data by 180 degrees and attempting the match again.

The applicants have recognized that a fingerprint sensor may be used by both left-handed and right-handed people, and in advance, it is not known what the most common finger swipe direction will be. Furthermore, it is anticipated that some of the embodiments disclosed herein may permit the fingerprint sensor to be in different orientations relative to the user over time. For example, in some cases, the fingerprint sensor may be incorporated in a device that is hanging around the user's neck (e.g., hanging from a lanyard). As another example, the device may be worn by the user (e.g., removably attached to the user's clothing). In other cases, the device may be kept in the user's pocket or bag. In other cases, the device may be on the user's desk. Since the device may be portable and wearable in various embodiments, various other orientations are possible. Furthermore, the user's ability to swipe in a particular direction or with a particular hand may change over time (for example if the user's dominant hand is engaged in a task such as writing or holding an object such as a communication device). Accordingly, the applicants have recognized a need for predicting which direction was used in swiping a finger, when attempting a match.

The described embodiments relate generally to methods, systems and mobile devices employing fingerprint or finger swipe user authentication. Further embodiments relate generally to computing devices that employ fingerprint or finger swipe user authentication. Mobile devices are used herein as one example of a type of computing device.

In a broad aspect, there is provided a method for finger swipe verification for a computing device. The computing device may comprise a mobile device. The method may include: storing a default finger swipe scan direction in a memory; receiving a finger swipe scan; authenticating the received finger swipe scan; determining a received finger swipe scan direction; and configuring the default finger swipe scan direction. The received finger swipe scan direction may be stored. Authenticating the received finger swipe scan may involve comparing the received finger swipe scan to authenticated finger swipe data in a direction corresponding to the default finger swipe scan direction.

In some implementations, configuring the default finger swipe scan direction involves changing the default finger swipe scan direction to correspond to the received finger swipe scan direction. The default finger swipe scan direction may be changed to correspond to the received finger swipe scan direction if a predetermined number of stored finger swipe scan directions differ from the default finger swipe scan direction. The default finger swipe scan direction may also be changed to correspond to the received finger swipe scan direction if a predetermined number of consecutive stored finger swipe scan directions differ from the default finger swipe scan direction. Furthermore, the default finger swipe scan direction may be changed to correspond to the received finger swipe scan direction if a predetermined percentage of stored finger swipe scan directions differ from the default finger swipe scan direction. As well, the default finger swipe scan direction may be changed to correspond to the received finger swipe scan direction if a predetermined number of consecutive stored finger swipe scan directions differ from the default finger swipe scan direction within a predetermined period of time.

Another broad aspect is directed towards a computing device having: a processor; a finger swipe sensor operatively coupled to the processor; and a memory accessible to the processor. The computing device may comprise a mobile device. The memory stores a default finger swipe scan direction and also stores program code which, when executed by the processor, causes the processor to perform the method of, upon the finger swipe sensor receiving a finger swipe scan: authenticating the received finger swipe scan; determining a received finger swipe scan direction; and configuring the default finger swipe scan direction. In some embodiments, the memory further stores program code which, when executed by the processor, causes the processor to store the received finger swipe scan direction.

The authenticating of the received finger swipe scan may involve comparing the received finger swipe scan to authenticated finger swipe data in a direction corresponding to the default finger swipe scan direction. In some implementations, configuring the default finger swipe scan direction may involve changing the default finger swipe scan direction to correspond to the received finger swipe scan direction. The default finger swipe scan direction may be changed to correspond to the received finger swipe scan direction if a predetermined number of stored finger swipe scan directions differ from the default finger swipe scan direction. Further, the default finger swipe scan direction may be changed to correspond to the received finger swipe scan direction if a predetermined number of consecutive stored finger swipe scan directions differ from the default finger swipe scan direction. The default finger swipe scan direction may also be changed to correspond to the received finger swipe scan direction if a predetermined percentage of stored finger swipe scan directions differ from the default finger swipe scan direction. In addition, the default finger swipe scan direction may be changed to correspond to the received finger swipe scan direction if a predetermined number of consecutive stored finger swipe scan directions differ from the default finger swipe scan direction within a predetermined period of time.

Computer readable storage storing program code is also provided which, when executed by a processor, causes the processor to perform a method of user authentication. The method may include: receiving a finger swipe scan; authenticating the received finger swipe scan; determining a received finger swipe scan direction; and configuring a default finger swipe scan direction.

These and other aspects and features of various embodiments will be described in greater detail below.

The mobile device, and fingerprint authenticator are described in further detail below, with reference to FIGS. 1 to 3 to contextualize some of the possible applications of the described embodiments. As used herein, "fingerprint" and "finger" are meant to include fingers, hands or other body parts which may be swiped across a scanner to provide biometric identification.

Figure 1:
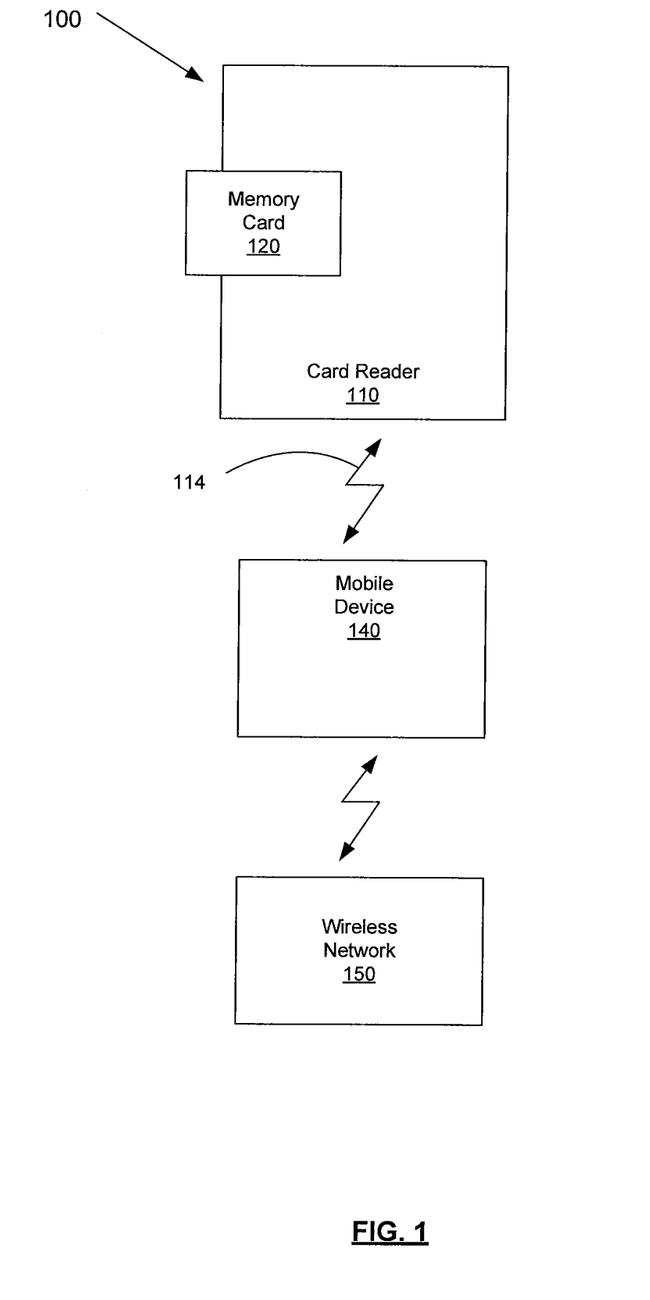
FIG. 1 is a block diagram of a system for authenticating a user.

FIG. 1 depicts a system 100 for authenticating a user for access to a computing device such as a mobile device 140. The system 100 may comprise a memory card 120 received by, or otherwise communicably coupled with, a card reader 110 (such as card reader 110' illustrated in FIGS. 4B and 4C). "Communicably coupled" as used herein is meant to describe any kind of coupling, for example physical, electrical, logical, signal and/or wireless coupling, or a combination thereof, sufficient to enable communication of signals, data, instructions or other meaningful exchange between the two components. Such coupling may be direct or indirect. The mobile device 140 may be any suitable wirelessly enabled mobile device. The mobile device 140 may be a dual mode (data and voice) communication device and personal digital assistant device, such as is described in further detail below in relation to FIG. 2. Alternatively, the mobile device may be a single mode (data) communication device. The mobile device 140 may be capable of email communication. The user of mobile device 140 is required to authenticate the user's identity for use of the mobile device 140, for example by providing a password or a personal identification number (PIN) code or other authentication methods as described herein, for example to unlock a user interface of mobile device 140, to digitally sign a message or to decrypt an encrypted message.

Memory card 120 may be a smart card. The memory card 120 may be specifically associated with one or more individuals and provide a means for authenticating such user's permission to access the mobile device 140 and/or other computer systems or devices operatively coupled to the network 150. Smart cards generally refer to personalized security devices, defined by the ISO 7816 standard and its derivatives, as published by the International Organization for Standardization.

A smart card may have a configuration similar to that of a credit card and may include a semiconductor device. The semiconductor device may include a memory that can be programmed with security information, for example such as a private decryption key, a private signing key, biometrics information or an authentication certificate, as well as any access restrictions for the authorized user(s). The biometrics information may include the authenticated fingerprint swipe data of the authorized user(s), as will be discussed in further detail, below.

The semiconductor device may include a decryption engine, such as a processor and/or dedicated logic circuitry for performing decryption and/or authentication functions. The smart card may include a connector for powering the semiconductor device and performing serial communication with an external device, such as card reader 110.

Smart cards generally have exposed contacts on one surface of the card for establishing electrical contact with corresponding contacts on the card reader, thereby facilitating communication between the smart card and the card reader. In one embodiment, memory card 120 and card reader 110 use electrical contact to establish communication therebetween. Although memory card 120 may be physically received in card reader 110, it is not essential that card reader 110 physically receive or contact memory card 120 in order to establish communication therebetween. For example, in an alternative embodiment, memory card 120 may interface with card reader 110 using radio frequency identification (RFID) or other contactless technology. In such an alternative embodiment, the memory card 120 can be sufficiently proximate to card reader 110 to enable radio frequency communication therebetween.

Mobile device 140 may be enabled to communicate with a wireless network 150. The wireless network 150 may be implemented as a packet-based cellular network that includes a number of base stations each providing wireless Radio Frequency (RF) coverage to a corresponding area or cell. For example, the wireless network 150 could conform to one or more of the following, among other network standards: Mobitex Radio Network; DataTAC; Global System for Mobile Communication (GSM); General Packet Radio System (GPRS); Time Division Multiple Access (TDMA); Code Division Multiple Access (CDMA); Evolution Data Optimized (EVDO); Cellular Digital Packet Data (CDPD); Integrated Digital Enhanced Network (iDEN); Enhanced Data rates for GSM Evolution (EDGE); or Universal Mobile Telecommunications Systems (UMTS), etc.

In some embodiments, instead of, or in addition to, a wireless wide area network, the wireless network 150 may include a wireless local area network, such as, for example, a wireless local area network that conforms to one or more IEEE 802.11 standards, such as 802.11b, 802.11g and 802.11n. In at least some example embodiments, the wireless network 150 is connected, through intermediate communications links (not shown), including, for example, links through the Internet, to one or more enterprise networks (not shown). Typically, such enterprise networks are each associated with a set of respective mobile devices 140, such that the mobile devices 140 are each enabled to exchange electronic messages and other information with the enterprise networks with which the mobile devices 140 are associated.

Figure 2:
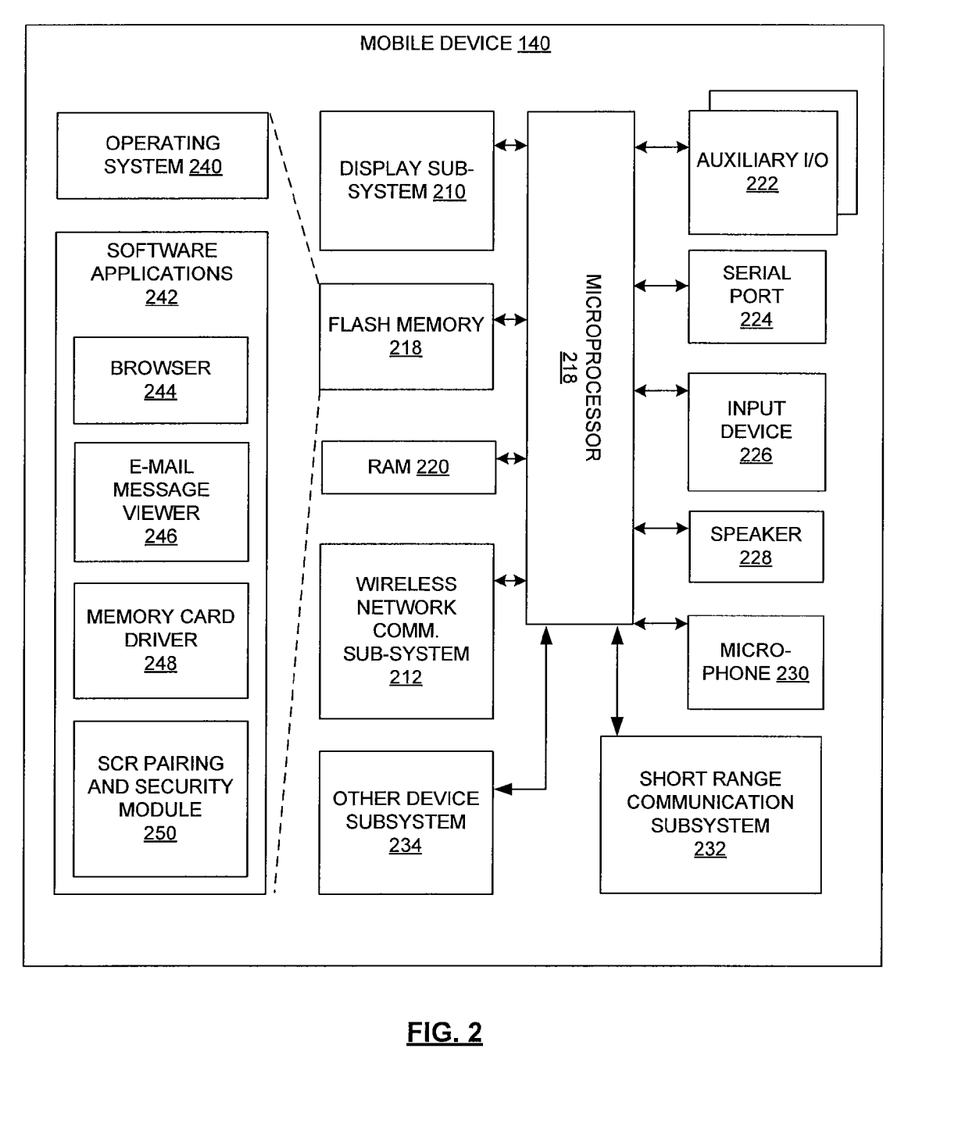
FIG. 2 is a block diagram of a mobile device for use in the system of FIG. 1.

FIG. 2 illustrates an exemplary detailed embodiment of the mobile device 140. The mobile device 140 may comprise a display sub-system 210 and a wireless network communication subsystem 212 for two-way communications with the wireless network 150 (FIG. 1). According to one embodiment, the communication subsystem 212 includes antennas (not shown), RF transceivers (not shown) and some signal processing capabilities that may be implemented, for example, by a digital signal processor (not shown). The mobile device 140 also includes a controller in the form of at least one mobile device microprocessor 216 that is suitably programmed to control the overall operation and functions of the mobile device 140, which are described in more detail below.

The mobile device 140 may further comprise peripheral devices and/or subsystems. Such peripheral devices and/or subsystems may include, for example, a flash memory 218, a random access memory (RAM) 220, and/or an auxiliary input/output (I/O) subsystem 222 (e.g., a scroll wheel, trackball, joystick, directional-pad, touch-screen or other navigational component). The peripheral devices and/or subsystems may also include a serial port 224 (e.g., a Universal Serial Bus, or "USB", port), an input device 226, a speaker 228, and/or a microphone 230. A mobile device short-range communications subsystem 232 and/or another device subsystem designated generally by reference 234 may also be provided. The short-range communication subsystem 232 may comprise, for example, an infrared transceiver, wireless bus protocol system, such as Bluetooth™, and/or other means of local wireless communications. The input device 226 may comprise, for example, a keyboard, a keypad and/or a touch-screen. The touch-screen may be used in combination with a stylus or one or more fingers, for example.

The mobile device microprocessor 216 operates under stored program control with code or firmware being stored in the flash memory 218 (or other type of non-volatile memory device or devices). As depicted in FIG. 2, the flash memory 218 includes stored programs (e.g., firmware) including an operating system program or code module 240 and other programs or software applications indicated generally by reference 242. The software applications 242 can, for example, include a World Wide Web (WWW) browsing application 244 and an e-mail client application 246.

According to example embodiments, the software applications 242 of the mobile device 140 further include a memory card driver 248 that may be used in conjunction with the card reader 110, which is described in more detail below in connection with FIG. 3. Notably, the memory card driver 248 may be provided, not by the manufacturer of the mobile device 140, but, instead, by a third party, e.g., the manufacturer of the memory card 120. Furthermore, an Application Programming Interface (API) may be built in to the memory card driver 248 to allow the mobile device 140 to communicate with the memory card 120 through the card reader 110.

The software applications 242 of the mobile device 140 may further include a smart card reader (SCR) pairing and security module 250 for coordinating a pairing process between the mobile device 140 and the card reader 110. The roles of the memory card driver 248 and the smart card reader pairing and security module 250 will be described in greater detail below.

The operating system code 240, code for specific device applications 242, code for the WWW browsing application 244, code for the e-mail client application 246, code for the memory card driver 248, or code for the smart card reader pairing and security module 250 may be temporarily loaded into a volatile storage medium such as the RAM 220 during operation of the mobile device 140. Received communication signals and other data with information may also be stored in the RAM 220.

In some embodiments, the mobile device 140 may include, in addition to the internal flash memory 218, persistent memory carried on a SIM (Subscriber Identity Module) card, or other removable device inserted into a memory interface, and at least some of the flash memory 218 may be allocated to the SIM card flash memory. A SIM card is one type of a conventional "smart card" used to identify a subscriber of mobile device 140 and to personalize the mobile device 140, among other things. Without such a subscriber card, mobile device 140 may not be fully operational for communication with network 150.

Alternatively, by way of example only, other types of "smart cards" which may be used may include an R-UIM (removable user identity module) or a CSIM (CDMA (code division multiple access) subscriber identity module) or a USIM (universal subscriber identity module) card.

By inserting the subscriber card into memory interface, a subscriber can access all subscribed services. Services may include without limitation: web browsing and messaging such as e-mail, voice mail, Short Message Service (SMS), Multimedia Messaging Services (MMS), and peer-to-peer messages such as PIN-to-PIN which may also be referred to simply as PIN messages. As used in this context, a PIN (product identification number) generally refers to a number that uniquely identifies the mobile device 100, and a PIN message generally refers to a message addressed to one or more PIN numbers. More advanced services may include without limitation: point of sale, field service and sales force automation.

The stored program control (i.e., the software applications 242) for the mobile device microprocessor 216 also includes a predetermined set of applications, code components or software modules that control basic device operations, for example, data and voice communication applications which are normally installed on the mobile device 140 as the software applications 242 during the manufacturing process. Further applications may also be loaded (i.e., downloaded) onto the mobile device 140 through the operation of networks described above, the auxiliary I/O subsystem 222, the serial port 224 or the mobile device short-range communications subsystem 232. The downloaded code modules or components are then installed by the user (or automatically) in the RAM 220 or the non-volatile program memory (e.g., the flash memory 218).

The serial port 224 may comprise a USB-type interface port for interfacing or synchronizing with another device, such as a desktop or notebook computer (not shown). The serial port 224 may be used to set preferences through an external device or software application. The serial port 224 may also be used to extend the capabilities of the mobile device 140 by providing for information or software downloads, including user interface information, to the mobile device 140 other than through a wireless communication network. In one embodiment, the serial port 224 may be used to communicate with card reader 110.

The mobile device short-range communications subsystem 232 provides an interface for communication between the mobile device 140 and other devices, including the card reader 110, to be described in greater detail in connection with FIG. 3, below. For example, the mobile device short-range communications subsystem 232 may employ an infrared communication link or channel, or may operate according to a wireless bus protocol, such as Bluetooth™, or any other localized wireless means of communication.

Figure 3:
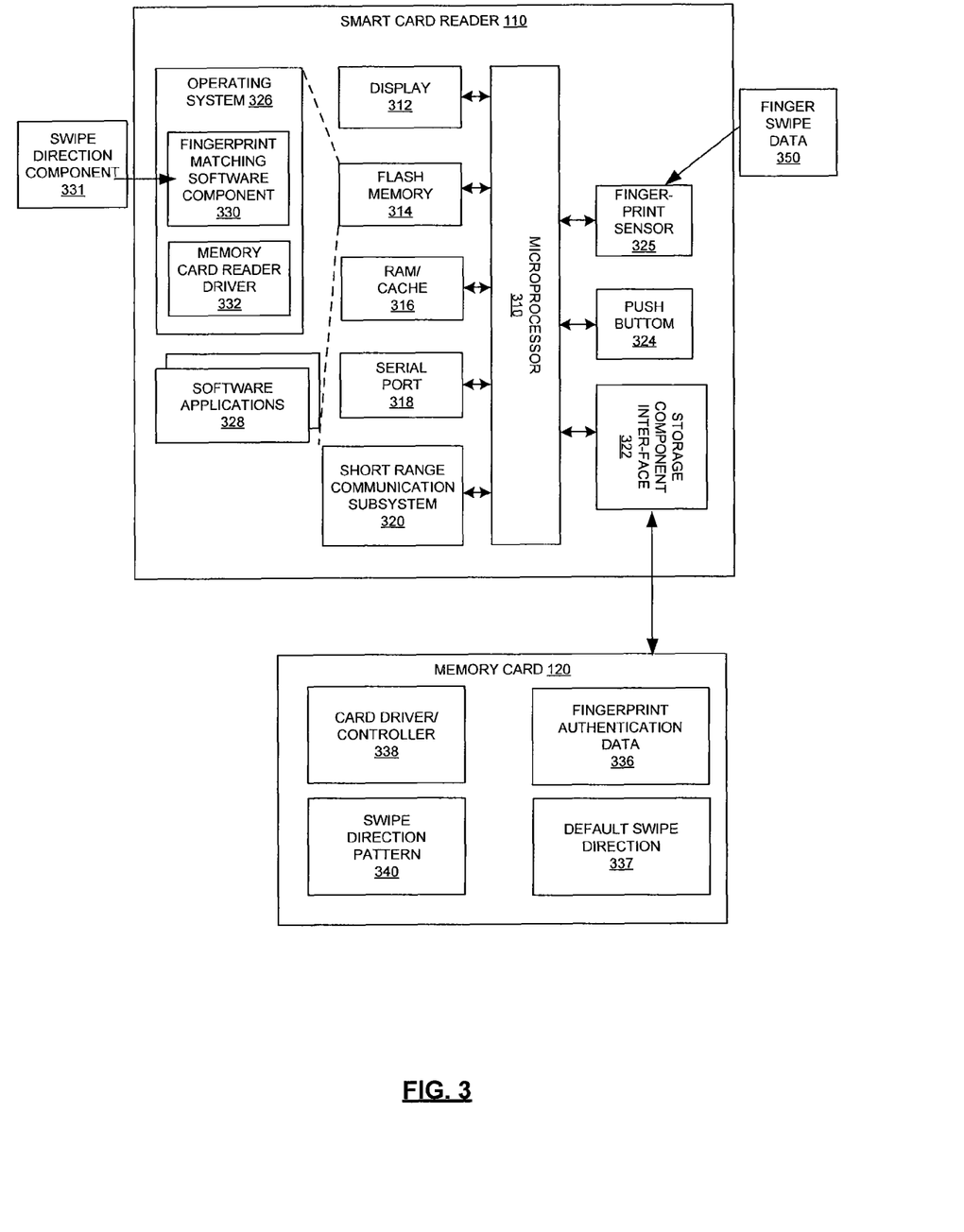
FIG. 3 is a block diagram of a memory card reader for use in some embodiments of the system of FIG. 1.

FIG. 3 illustrates an example embodiment of the card reader 110, in the exemplary form of a smart card reader. The card reader 110 may be in the form of a computing device and may comprise a controller including at least one smart card reader microprocessor 310, which is suitably programmed to control the overall operation and functions of the card reader 110. The card reader 110 may comprise a housing and in some embodiments may be sufficiently portable to be worn (e.g., with a lanyard or strap) around the user's neck, or carried in a pocket.

Figure 4A:
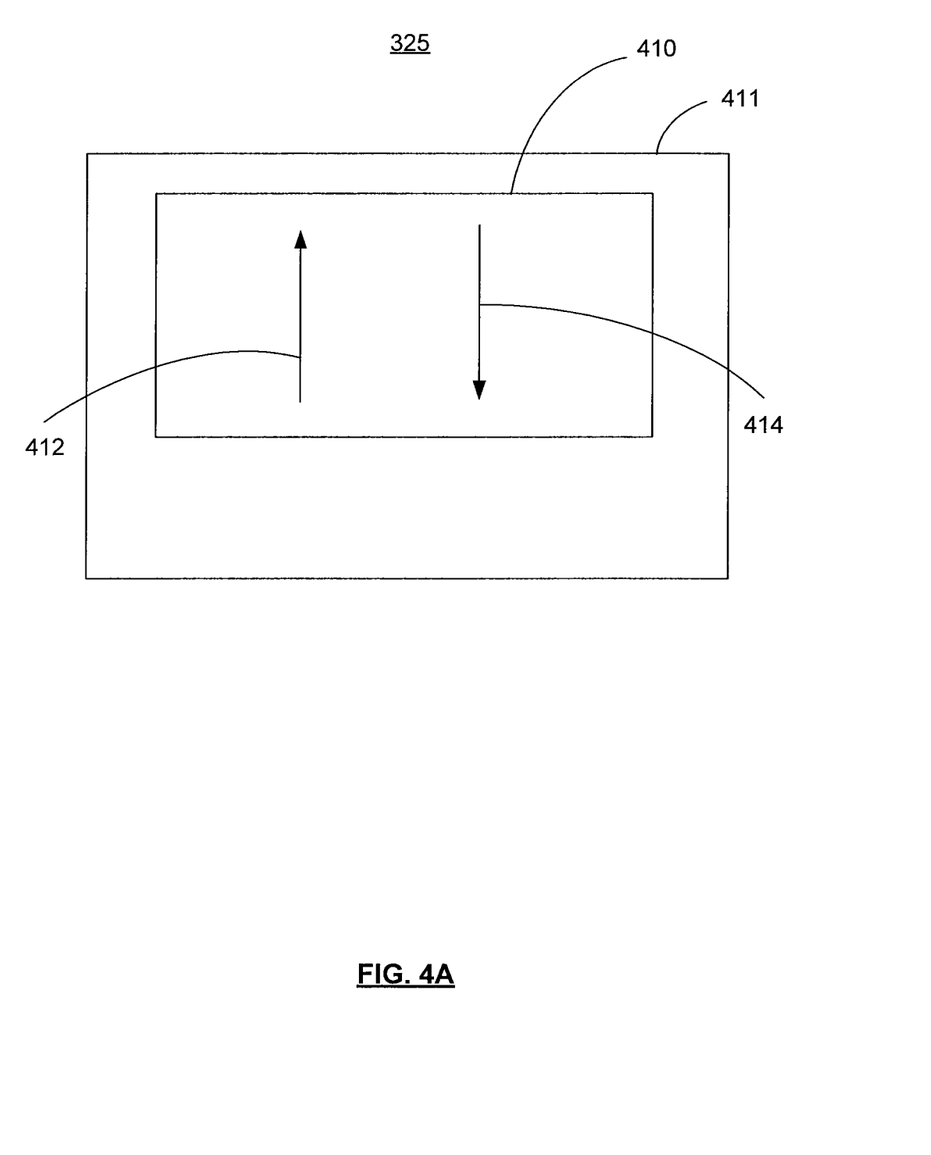
FIG. 4A is a schematic illustration of a portion of a fingerprint sensor for use in some embodiments of the system of FIG. 1.
Figure 4B:
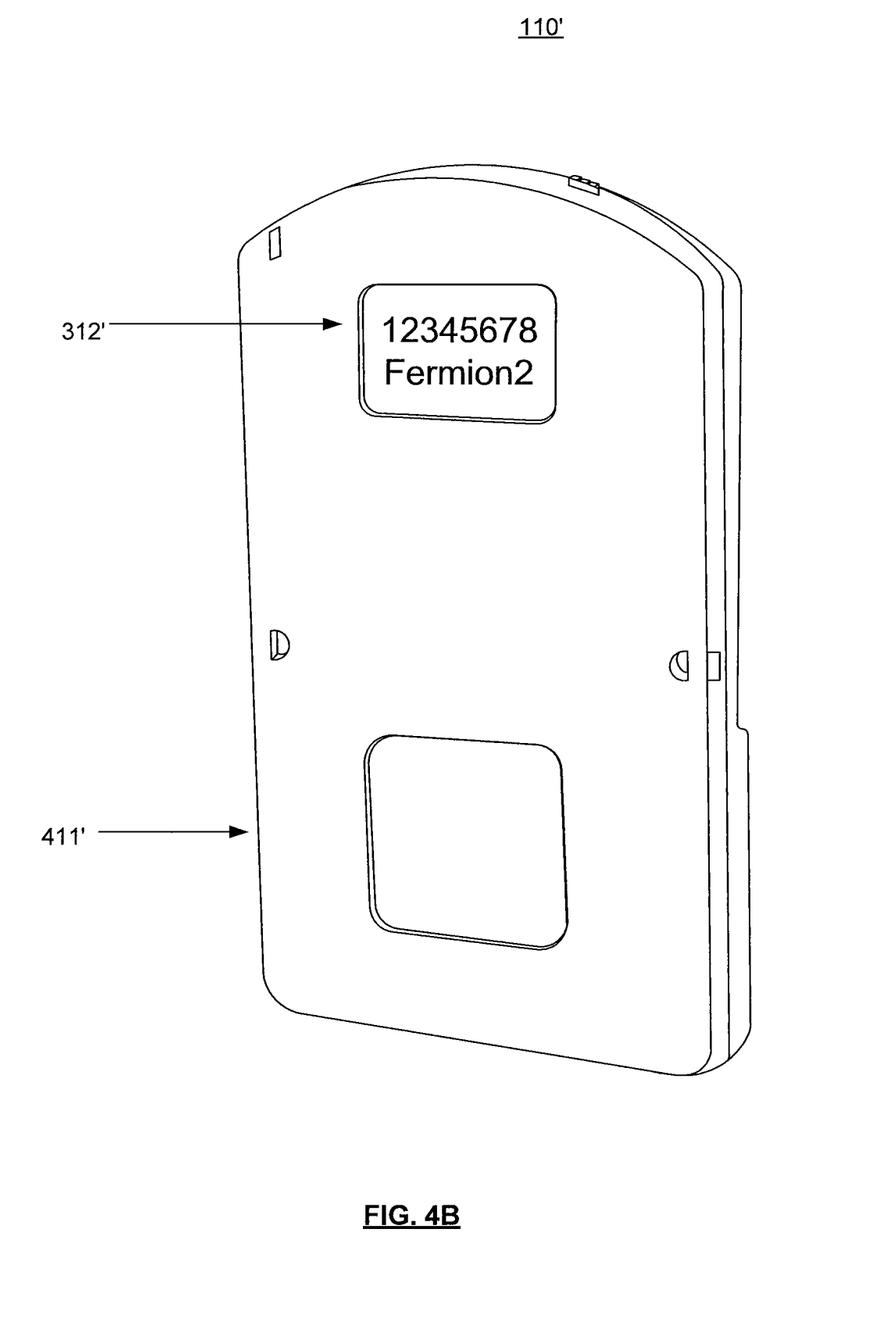
FIGS. 4B and 4C are illustrations of an embodiment of a fingerprint sensor from rear and front perspective views, respectively.

The card reader 110 may further comprise an output device 312 (e.g., a display module 312' as illustrated in FIG. 4B). The card reader 110 may further comprise peripheral devices or subsystems such as a flash memory 314, a random access memory (RAM) 316, which, in some embodiments, includes a portion allocated to a data cache, a serial port 318 (e.g., a USB port), and/or a smart card reader short-range communications subsystem 320 (e.g., an infrared transceiver, wireless bus protocol system using a protocol such as a Bluetooth™). The reader 110 may also include a storage component interface 322 (e.g., for a memory card or any other data storage device), a pairing-activation input device 324 (e.g., a push button) and a fingerprint or finger swipe sensor 325. Such a fingerprint sensor 325 may comprise any kind of suitably secure handprint and/or fingerprint scanner.

Referring briefly to FIG. 4A, illustrated therein is a portion of an exemplary embodiment of fingerprint or finger swipe sensor 325 (such as sensor 325' illustrated in FIG. 4C) having a swiping surface 410 (such as surface 410' illustrated in FIG. 4C), across which a finger (or other body part) may be slid or swiped for scanning purposes. The swiping surface 410 may be embedded within a housing 411 (such as housing 411' illustrated in FIGS. 4B and 4C) (which in one embodiment may comprise part of the housing of the card reader 110, or alternatively may comprise part of the housing of the mobile device 140). As the finger is swiped across the swiping surface 410, the sensor 325 scans or detects biometric information which is used for authentication purposes. The scanner surface 410 may have a generally longitudinal configuration, facilitating swiping of a finger generally in a first direction indicated generally by arrow 412, or in a second direction indicated generally by arrow 414 opposite to the first direction 412.

In some configurations, the fingerprint sensor 325 may capture a static or substantially static image or imprint of a finger (from one of two substantially opposing orientations) in place of a swiping scan or series of images.

Figure 4C:
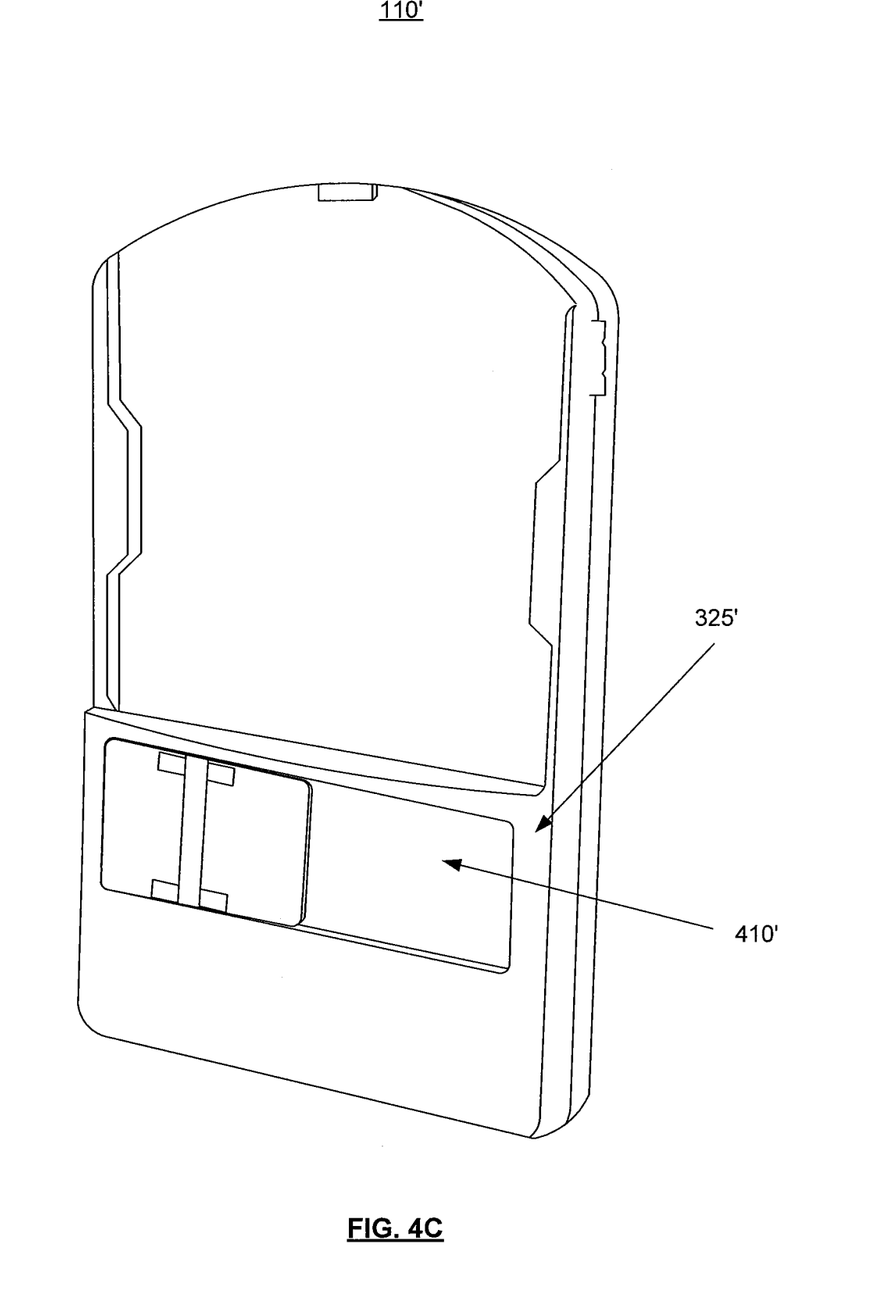

FIGS. 4B and 4C illustrate rear and front perspective views of an exemplary embodiment of a card reader 110'.

In alternate embodiments, the fingerprint sensor 325 may comprise part of a fingerprint authentication device remote from or in place of the card reader 110. Such a fingerprint authentication device may be in communication with mobile device 140 over a wired or wireless interface and may have a wireless transceiver for communicating with mobile device 140. Alternatively, such a fingerprint authentication device may be in communication with mobile device 140 via a wired connection, such as a universal serial bus (USB) cable. In yet a further alternate configuration, the fingerprint sensor 325 may comprise part of, and be integrated with, the mobile device 140.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The operating system 326 of the card reader 110 further includes a fingerprint matching software component 330 and a memory card reader driver component 332.

The fingerprint matching software component 330 is used to analyze or compare candidate fingerprints and/or finger swipes scanned by the fingerprint input device 325 (or fingerprint authentication device 130) in reference to stored fingerprint and/or finger swipe data 336. In alternate embodiments, the fingerprint matching software component 330 may be stored in memory storage and/or otherwise contained and run, for example, on the mobile device 140. As will be discussed in greater detail, below, the fingerprint matching software component 330 may also comprise a swipe direction component 331. The swipe direction component 331 manages a stored default swipe direction 337, used to anticipate the swipe direction in which the user will next likely swipe for authentication.

The memory card reader driver component 332 is responsible for coordinating communications between the card reader 110 and a memory card 120 and/or the memory card driver 248 of the mobile device 140 (via wired or wireless communication link 114).

The operating system code 326, code for specific device applications 328, code for the fingerprint matching software component 330, code for the memory card reader driver component 332, or code components thereof, may be temporarily loaded into a volatile storage medium such as the RAM 316. Received communication signals and other data may also be stored in the RAM 316. Additionally, the storage component interface 322 receives the removable memory card 120, providing additional storage space for the card reader 110.

In one embodiment, the memory card 120 stores the fingerprint authentication data 336, default swipe direction 337 and swipe direction pattern 340 data (discussed in greater detail, below), although in other embodiments such data 336, 337, 340 may be stored elsewhere (for example without limitation, on the card reader 110 or on the mobile device 140) and has a card driver and controller 338 responsible for coordinating communications between the memory card 120 and the memory card reader driver component 332 of the smart card reader 110. While operation of the card reader 110 is described in a context wherein the memory card 120 comprises a smart card, the card reader 110 may be designed to operate with any suitable form of memory device.

The stored program control (i.e., software applications 328) for the smart card reader microprocessor 310 may include a predetermined set of applications, code components or software modules that control basic device operations, for example, management and security related control of the data of the card reader 110, and may be installed on the card reader 110 as a component of the software applications 328 during the manufacturing process. Further applications may also be loaded (i.e., downloaded) onto the card reader 110 through the operation of the serial port 318, the smart card reader short-range communications subsystem 320 or from the memory card 120. The downloaded code module or components are then installed by the user (or automatically) in the RAM 316 or non-volatile program memory (e.g., the flash memory 314).

While the fingerprint matching software component 330 and the memory card reader driver component 332 are shown to be an integrated portion of the operating system 326 for security purposes (e.g., because individuals should not be permitted to tamper with the fingerprint matching software component 330 or the memory card reader driver component 332), the fingerprint matching software component 330 and/or the memory card reader driver component 332 could be installed as one of the software applications 328 so long as suitable security related precautions are taken to ensure that the fingerprint matching software component 330 and the memory card reader driver component 332 cannot be modified or tampered with by unauthorized users.

The serial port 318 may be a USB-type interface port for interfacing or synchronizing with another device, such as a desktop computer (not shown) or the mobile device 140. The serial port 318 is used to set preferences through an external device or software application or exchange data with a device, such as the mobile device 140, which data is stored on the memory card 120 that is plugged into the storage component interface 322 of the card reader 110. The serial port 318 is also used to extend the capabilities of the card reader 110 by providing for downloads, to the card reader 110, of information or software, including user interface information.

The short-range communications subsystem 320 provides an interface for communication between the mobile device 140 and the card reader 110. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 232 (FIG. 2) of the mobile device 140 can operate using the same protocol, thereby facilitating wireless communication between the mobile device 140 and the card reader 110. Any communications mechanism and/or protocol may be implemented for the short-range communications subsystems 232, 320, so long as the mobile device 140 and the card reader 110 can communicate with each other when within physical proximity.

Figure 5:
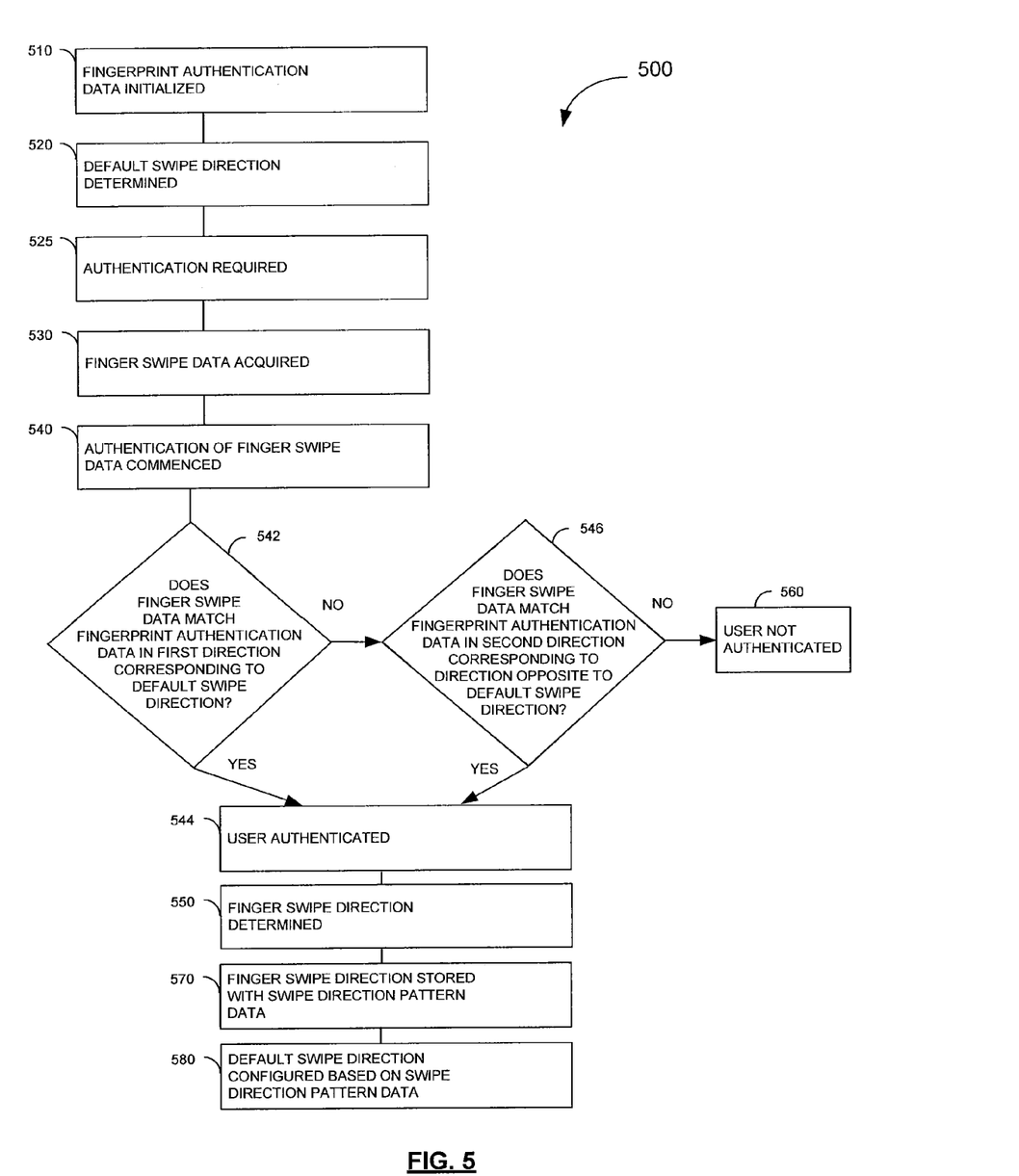
FIG. 5 is a flowchart of a method of fingerprint authentication.

Referring now to FIG. 5, an exemplary method 500 of finger swipe verification is shown. Method 500 may begin with a fingerprint initialization in step 510, during which the user's fingerprint authentication data 336 is input and stored. This step may involve the fingerprint matching software component 330 (in communication with the mobile device 140) to prompt the user to swipe his/her finger across the fingerprint scanner 325 to generate the fingerprint authentication data 336. In some embodiments, the user may be permitted by the fingerprint matching software component 330 to authenticate more than one fingerprint (for example, the fingerprint from the user's left index finger and right index finger and/or any other finger). A text or other visual prompt to commence a finger swipe may be presented to the user on the display 210 of the mobile device 140.

The user may be prompted to swipe his/her finger across the scanner 325 a second time (or more times) to verify the consistency of the fingerprint authentication data 336. The matching software component 330 may then store the authentication data 336 in memory (such as on memory card 120). In some embodiments, scans from multiple fingers may be input and stored in the authentication data 336 (for example, a left hand index finger swipe and a right hand index finger swipe).

In step 520, a default swipe direction 337 may be determined and stored in memory (such as on memory card 120). The default swipe direction 337 may be input via an input device 226 such as a keyboard on the mobile device 140 in response to being prompted by the fingerprint matching software component 330 (in communication with the mobile device 140). For example, the display 210 may prompt the user with "Swipe to the Left or to the Right (L/R)?" to which the user may input either an "L" or "R" in response. Other swipe direction configurations (for example "Toward" or "Away") and corresponding prompt messages may be used in different embodiments. Data corresponding to the indicated swipe direction may then be stored as the default swipe direction 337. Alternatively, the matching software component 330 may determine which direction the user swiped his/her finger during the initialization step 510, and data corresponding to such direction may be stored as the default swipe direction 337. As yet a further alternative, the default swipe direction 337 may be predetermined to be a preferred swipe direction such as, for example, swiping from the outside to the inside using a finger on the left hand when the reader 110' is worn on a lanyard around the user's neck (card facing out).

In time, at step 520, a security application (which may reside on the mobile device 140, for example) may determine that user fingerprint authentication is required, for example, where the mobile device 140 is requested by a user to be accessed or where the user is required to be authenticated to access sensitive information stored on mobile device 140.

Once it is determined that fingerprint authentication is required at step 525, for example, in order to access mobile device 140 or data stored therein, the user's finger swipe data 350 is acquired or input via the fingerprint scanner 325, at step 530. As with the fingerprint initialization in step 510, the user may be prompted by the fingerprint matching software component 330 (in communication with the mobile device 140) to swipe his/her finger across the fingerprint scanner 325 to generate the finger swipe data 350. A text or other visual prompt to commence a finger swipe may be presented on the display 210 of the mobile device 140.

In analyzing the finger swipe data 350, the fingerprint matching software component 330 may authenticate the received finger swipe scan data 350 commencing at step 540, and determine the finger swipe direction of the finger swipe data 350 at step 550.

The fingerprint matching software component 330 may attempt to match or otherwise compare the finger swipe data 350 to the fingerprint authentication data 336 in a first direction corresponding to the default swipe direction 337, at step 542. In some embodiments in which fingerprint authentication data 336 has been stored corresponding to more than one finger, the finger swipe data 350 may be compared to the fingerprint authentication data 336 for each finger in the first direction. If the fingerprint data 350, 336 matches, the user is authenticated at step 544 (and an appropriate authentication message may be provided on display subsystem 210), and the finger swipe direction of the finger swipe data 350 is determined to correspond to the default swipe direction 337 at step 550.

If a match is not found, the finger swipe data 350 is rotated by 180 degrees and the fingerprint matching software component 330 may attempt to match the finger swipe data 350 to the fingerprint authentication data 336 (effectively in a second direction opposite to the first direction and to the default swipe direction 337), at step 546. Again, in some embodiments in which fingerprint authentication data 336 has been stored corresponding to more than one finger, the rotated finger swipe data 350 may be compared to the fingerprint authentication data 336 for each finger (effectively in a second direction opposite to the first direction and to the default swipe direction 337). If the rotated finger swipe data 350 matches the authentication data 336, the user is authenticated at step 544 and the finger swipe direction of the finger swipe data 350 is determined to correspond to the second direction, opposite to the default swipe direction 337 at step 550.

If no match is made between the fingerprint data 350, 336, then the user is not authenticated and a non-authentication message may be provided on display subsystem 210 at step 560. If the user is authenticated at step 544, then the finger swipe direction determined at step 550 is added to and stored with the swipe direction pattern 340 data at step 570.

In step 580, the default swipe direction 337 may then be configured based on the swipe direction pattern 340 data. In one embodiment, if there are multiple successive failures (for example, 3 successive failures) to predict the finger swipe direction determined at step 550 (in other words in which the finger swipe direction determined at step 550 is opposite to the default swipe direction 337) the default swipe direction 337 may be made to match the finger swipe direction determined at step 550 (which would result in a reversing of the default swipe direction) and saved. Otherwise, the default swipe direction 337 may remain unchanged.

Other strategies for configuring or adjusting the default swipe direction 337 may be implemented in addition to or in place of the configuration strategy discussed above. Such strategies may be implemented for predicting a user's finger swipe direction. For example, in an alternative embodiment, the default swipe direction 337 may be made to match the finger swipe direction determined at step 550 if greater than a certain ratio or percentage of the most recent predictions of the finger swipe direction are failures (for example, 60% or 4 times out of 6). In yet an alternative embodiment, the default swipe direction 337 may be made to match the finger swipe direction determined at step 550 if multiple successive failures (or alternatively, a percentage of the most recent predictions of the finger swipe direction are failures) within a short period of time. As yet a further option, the swipe direction component 331 may be programmed to track the swipe direction pattern 340 data as a function of time, to determine, for example, if swipe direction patterns can be found which correspond to, for example, time of day. It may be, for example, that a user swipes in a certain direction first thing in the morning, but in an opposite direction thereafter.

As well, it should also be understood that in certain embodiments, the various different configuration strategies discussed above may be combined or adjusted manually or automatically. As a result, the failure threshold (for example, the 3 successive failures discussed in relation to step 580) may be adjusted (for example, to 2 successive failures).

While the above description describes the example embodiments in some detail, it will be appreciated that some features and/or functions of the described embodiments are susceptible to modification without departing from the spirit and principles of operation of the described embodiments. Accordingly, what has been described above is intended to be illustrative of the disclosure and non-limiting.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A method for finger swipe verification for a computing device, the method comprising:
   comparing a received finger swipe scan to authenticated finger swipe data in a direction corresponding to a default finger swipe scan direction;
   determining a received finger swipe scan direction; and
   configuring the default finger swipe scan direction.

2. The method as claimed in claim 1, wherein the received finger swipe scan direction is determined upon the matching of the received finger swipe scan to the authenticated finger swipe data.

3. The method of claim 1, wherein configuring the default finger swipe scan direction comprises changing the default finger swipe scan direction to correspond to the received finger swipe scan direction.

4. The method of claim 1, further comprising storing the received finger swipe scan direction.

5. The method of claim 4, wherein configuring the default finger swipe scan direction comprises changing the default finger swipe scan direction to correspond to the received finger swipe scan direction if a predetermined number of stored finger swipe scan directions differ from the default finger swipe scan direction.

6. The method of claim 4, wherein configuring the default finger swipe scan direction comprises changing the default finger swipe scan direction to correspond to the received finger swipe scan direction if a predetermined number of consecutive stored finger swipe scan directions differ from the default finger swipe scan direction.

7. The method of claim 4, wherein configuring the default finger swipe scan direction comprises changing the default finger swipe scan direction to correspond to the received finger swipe scan direction if a predetermined percentage of stored finger swipe scan directions differ from the default finger swipe scan direction.

8. The method of claim 4, wherein configuring the default finger swipe scan direction comprises changing the default finger swipe scan direction to correspond to the received finger swipe scan direction if a predetermined number of consecutive stored finger swipe scan directions differ from the default finger swipe scan direction within a predetermined period of time.

9. The method of claim 1, wherein the computing device comprises a mobile device.

10. A computing device comprising:
    a processor;
    a fingerprint sensor operatively coupled to the processor; and
    a memory accessible to the processor, wherein the memory stores a default finger swipe scan direction;
    wherein the memory stores program code which, when executed by the processor, causes the processor to:
       upon the fingerprint sensor receiving a finger swipe scan:
          compare the received finger swipe scan to authenticated finger swipe data in a direction corresponding to the default finger swipe scan direction;
          determine a received finger swipe scan direction; and
          configure the default finger swipe scan direction.

11. The device as claimed in claim 10, wherein the received finger swipe scan direction is determined upon the matching of the received finger swipe scan to the authenticated finger swipe data.

12. The computing device of claim 10, wherein the program code causes the processor to configure the default finger swipe scan direction by changing the default finger swipe scan direction to correspond to the received finger swipe scan direction.

13. The computing device of claim 10, wherein the memory further stores program code which, when executed by the processor, causes the processor to store the received finger swipe scan direction.

14. The computing device of claim 13, wherein the program code causes the processor to configure the default finger swipe scan direction by changing the default finger swipe scan direction to correspond to the received finger swipe scan direction if a predetermined number of stored finger swipe scan directions differ from the default finger swipe scan direction.

15. The computing device of claim 13, wherein the program code causes the processor to configure the default finger swipe scan direction by changing the default finger swipe scan direction to correspond to the received finger swipe scan direction if a predetermined number of consecutive stored finger swipe scan directions differ from the default finger swipe scan direction.

16. The computing device of claim 13, wherein the program code causes the processor to configure the default finger swipe scan direction by changing the default finger swipe scan direction to correspond to the received finger swipe scan direction if a predetermined percentage of stored finger swipe scan directions differ from the default finger swipe scan direction.

17. The computing device of claim 13, wherein the program code causes the processor to configure the default finger swipe scan direction by changing the default finger swipe scan direction to correspond to the received finger swipe scan direction if a predetermined number of consecutive stored finger swipe scan directions differ from the default finger swipe scan direction within a predetermined period of time.

18. The computing device of claim 13, wherein the computing device comprises a mobile device.

19. Computer readable storage storing program code which, when executed by a processor, causes the processor to perform a method of user authentication, comprising:
   receiving a finger swipe scan;
   configuring a default finger swipe scan direction;
   comparing the received finger swipe scan to authenticated finger swipe data in a direction corresponding to the default finger swipe scan direction; and
   determining a received finger swipe scan direction.

20. The computer readable storage as claimed in claim 19, wherein the received finger swipe scan direction is determined upon the matching of the received finger swipe scan to the authenticated finger swipe data.

\* \* \* \* \*